United States Patent [19]

Westphal

[11] 3,956,665

[45] May 11, 1976

[54] DEVICE FOR REPLACING A FLUORESCENT LAMP IN A SERIALLY CONNECTED FLUORESCENT LAMP SYSTEM

[75] Inventor: James A. Westphal, Altadena, Calif.

[73] Assignee: California Institute of Technology, Pasadena, Calif.

[22] Filed: Apr. 11, 1975

[21] Appl. No.: 567,285

Related U.S. Application Data

[63] Continuation-in-part of Ser. No. 496,067, Aug. 9, 1974, abandoned.

[52] U.S. Cl. .................................. 315/95; 240/153; 315/99; 315/122; 315/179; 315/187; 315/228; 315/231; 315/312; 315/363; 317/256

[51] Int. Cl.[2] .................. H05B 41/16; H05B 41/46; H01G 1/02

[58] Field of Search ................... 315/71, 75, 88, 90, 315/92, 94, 99, 106, 119, 121, 122, 125, 126, 178, 179, 187, 191, 227 R, 228, 229, 231, 312, 363, 95, 96; 333/24 C; 317/242, 256, 257; 307/157; 313/237; 240/51.11 R, 153

[56] References Cited

UNITED STATES PATENTS

| | | | |
|---|---|---|---|
| 774,812 | 11/1904 | Wurts | 315/126 X |
| 2,637,833 | 5/1953 | Skrotzki | 315/187 |
| 2,774,917 | 12/1956 | Passmore | 315/DIG. 4 |

*Primary Examiner*—Eugene LaRoche
*Attorney, Agent, or Firm*—Lindenberg, Freilich, Wasserman, Rosen & Fernandez

[57] ABSTRACT

A device for replacing a fluorescent lamp in a two lamp serially connected fluorescent fixture either of the type which includes a rapid-start type transformer for every two rapid-start fluorescent lamps or an instant start fixture for every two instant start lamps. By placing the device in the fixture in place of one of the two lamps the remaining lamp is energizable to provide illumination, whereas without the device the remaining lamp is inactive.

13 Claims, 5 Drawing Figures

DEVICE FOR REPLACING A FLUORESCENT LAMP IN A SERIALLY CONNECTED FLUORESCENT LAMP SYSTEM

ORIGIN OF THE INVENTION

This application is a Continuation-in-Part of application Ser. No. 496,067, filed August 9, 1974 by the inventor, now abandoned.

BACKGROUND OF THE INVENTION

1. Field of the Invention

The present invention relates to fluorescent lamps and, more particularly, to a device for replacing a rapid-start or instant start type fluorescent lamp in a fixture in which these lamps are serially connected.

2. Description of the Prior Art

Fluorescent lamps of the rapid-start or instant start type, hereinafter simply referred to as lamps, are extensively used for illumination (lighting), particularly in commercial establishments, such as office building and industrial facilities. Most fixtures for such lamps are designed to accommodate an even number of lamps, typically two or four. In the rapid start type fixture a separate transformer, often referred to as a ballast, is included for each pair of lamps which when inserted in the fixture become connected in series with a winding of the transformer. In a two-lamp fixture a single transformer is included, while two such transformers are included in a four-lamp fixture. In an instant start type fixture a transformer with an auxiliary winding is also used for each pair of lamps with the secondary winding connecting two lamps in series. The failure or removal of one lamp deactivates the other lamp with which it is connected in series. Thus, in a two-lamp fixture if one lamp fails, generally being referred to as burned out, or is removed the other lamp is deactivated and therefore no illumination is produced.

The recent energy crisis in the United States has greatly affected the life of most Americans. In localitites where electrical power is generated by the use of fossil type fuel, the curtailment of the use of electrical power by about 20% in private homes as well as in commercial and industrial establishments was requested or ordered by law. In order to comply with these requests many lamps had to be removed from existing fixtures. In a two-lamp fixture, the removal of one lamp deactivated the other, and therefore the area or space which the already installed two-lamp fixture was to illuminate was darkened. In a four-lamp fixture the removal of one lamp deactivated one of the remaining lamps, so that illumination was provided by only two of the remaining three lamps, resulting in an illumination reduction of 50%. The removal of the lamps resulted in unsatisfactory light distribution, since, in constructing the buildings, the fixtures were located to provide proper lighting with all lamps in operation.

While the unsatisfactory light distributon was expected, in order to reduce power consumption the actual reduction in power was not as great as hoped for, due to the particular manner in which the conventional transformer used for each pair of lamps is connected to the power lines. Such a transformer hereinafter also referred to as a two-lamp transformer, in the case of the rapid start fixture, has a portion of its main or primary winding permanently connected across the power lines. In the case of the instant start fixture, the primary winding is connected permanently across the power lines.

This is clearly seen in IES Lighting Handbook, Fourth Edition, published in 1966 by the Illuminating Engineering Society, 345 East 47th Street, New York, N.Y. 10017, on pages 8–24, FIGS. 8–33*d*. The shown schematic diagram is typical of practically all the transformers (or ballasts) used for rapid-start lamps. Consequently, some current flows in the portion of the main or primary winding across the lines and power is consumed even when no illumination is produced, either due to the absence of both lamps or the absence of one lamp which results in the deactivation of the other lamp. Thus, the mere removal of a lamp without disconnecting the transformer from the power lines does not result in total power saving.

In addition, in the absence of one or both lamps the power drawn by the transformer is very inductive. In an institution such as a scientific research institution, in which various pieces of equipment are operated, a requirement is often placed on the institution by the power department to adjust the power factor of all consumed power to a value of one. This is generally achieved by power-factor adjustment equipment, typically in the form of a large rotary capacitor which is very expensive. In such an institution, the added inductive loading of transformers by fixtures, from which lamps were removed, complicates the power factor adjustment. Thus, the removal of lamps from fixtures, in addition to resulting in disadvantageous light distribution does not produce the desired power saving proportional to the reduction in the illumination, and furthermore, adversely affects the power factor of the consumed power.

OBJECTS AND SUMMARY OF THE INVENTION

It is a primary object of the present invention to provide a device to enable the activation of a single lamp connected to a two-lamp fixture of the types described.

Another object of the invention is to provide a non-dissipative device for replacing one lamp in a fixture, in which a transformer is provided for each pair of lamps to be serially connected thereto, to enable the remaining lamp to be activated and provide illumination.

A further object of the invention is to provide a substantially nondissipative device for use as a direct replacement for a rapid-start or instant start lamp in a rapid-start or instant start fixture, in which a transformer is provided for each pair of serially connected lamps, to enable the remaining lamp to be activated, while at the same time maintaining the consumed power so that the power factor is not as adversely affected as is the case by a simple removal of a lamp.

These and other objects of the invention are achieved by providing a lamp replacement device, consisting of a capacitor whose value is selected at the operating frequency, e.g., 60Hz for providing optimum power efficiency for the particular type of fixture involved. By way of example, and not to serve as a limitation on the invention, this was found to be 4$\mu$f for a rapid start fixture and 6$\mu$f for an instant start fixture. Preferably, the capacitor is enclosed in a tube of a length equal to that of a conventional lamp, the tube's ends being capped by end caps with extending pins, identical to those of a conventional lamp. The capacitor is connected within the enclosing tube to one pin at each end. Such a device, when inserted in the end contacts provided in the fixture for one of the lamps, enables the other lamp to be energized. With such a capacitor the power factor is substantially greater than what it is without the capacitor.

The novel features of the invention are set forth with particularity in the appended claims. The invention will best be understood from the following description when read in conjunction with the accompanying drawings.

DESCRIPTION OF THE PREFERRED EMBODIMENTS

Figure 1:
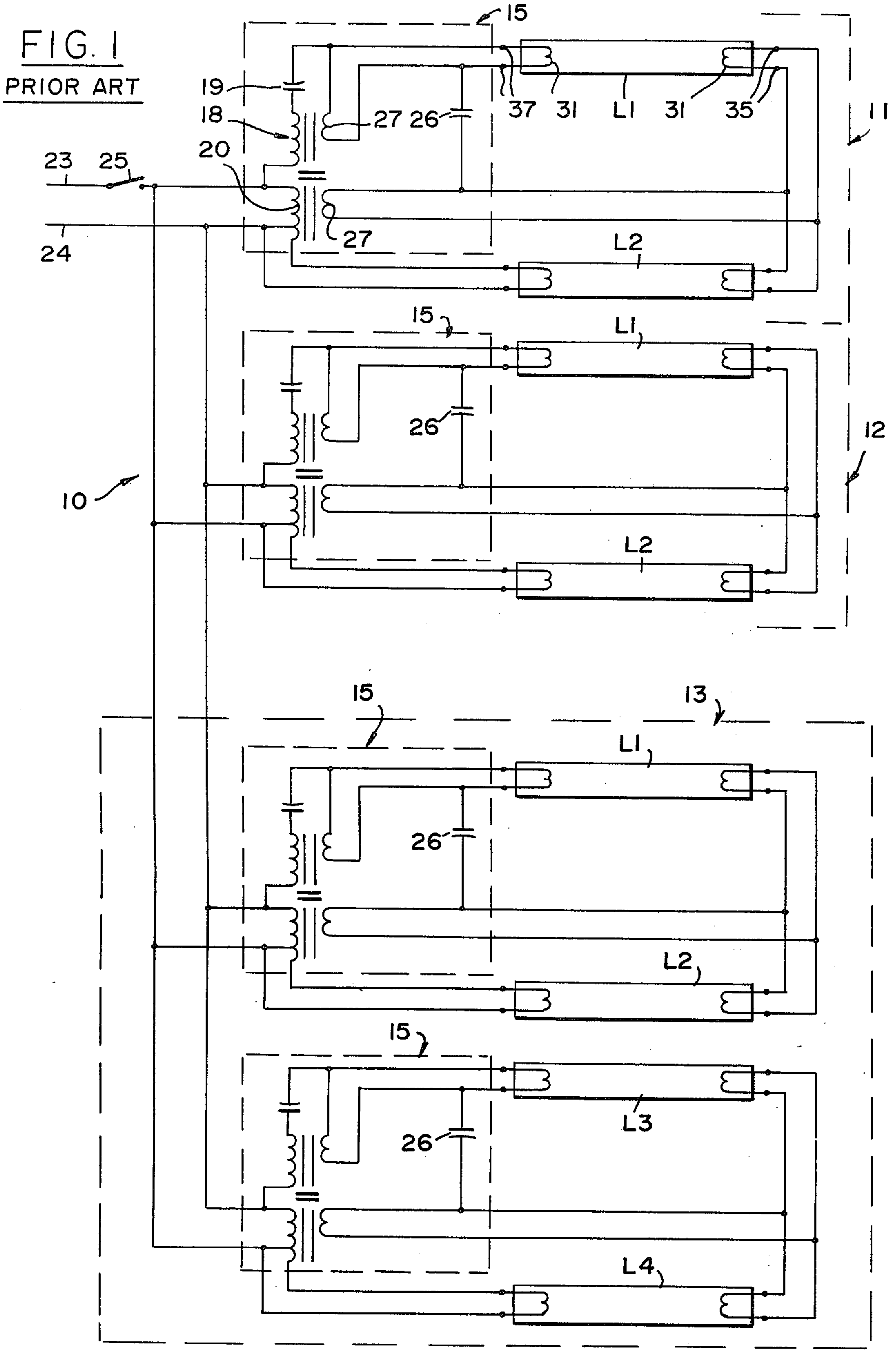
FIG. 1 PRIOR ART
FIG. 1 is a schematic diagram of a presently used rapid-start lighting arrangement.

FIG. 1 is a schematic diagram illustrating the prior art rapid start lighting arrangement 10, limited for explanatory purposes only to three fixtures, 11, 12 and 13. Each of fixtures 11 and 12 is a two-lamp fixture, including lamps L1 and L2 while fixture 13 is assumed to be a four-lamp fixture with lamps L1–L4.

Each of fixtures 11 and 12 includes a single transformer 15, as illustrated in the above-referred to handbook, while fixture 13 includes two transformers 15, one for each pair of lamps such as L1 and L2 and L3 and L4. Each transformer 15, is designed to serve two-lamps which are serially connected across its main winding 18 and a power factor adjusting capacitor 19. A portion of the main winding 18, designated by numeral 20, is permanently connected across the power lines 23 and 24 when switch 25, such as a wall switch, is closed. Each transformer 15 also includes a series start capacitor 26, and two filament-heating windings 27, whose function it is to heat the filaments 31 of the lamps.

Figure 2A:
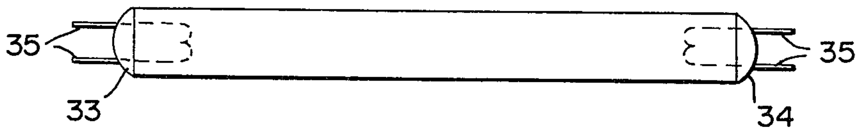
FIGS. 2*a* and 2*b* are diagrams of a conventional rapid-start lamp and the lamp-replacement device of the present invention, respectively.
Figure 2B:
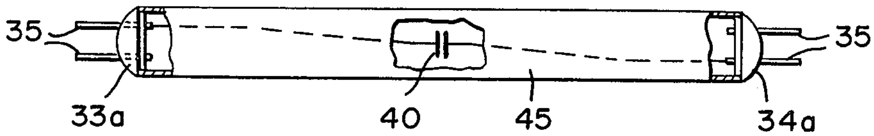

Each standard lamp, such as the one shown in FIG. 2*a*, has 2 end caps 33 and 34. Two pins 35, which in the tube are connected to the ends of one of the filaments, extend through each end cap. A lamp is inserted into the fixture by properly engaging the pins 35 within appropriate female receptacles or contacts, designated in FIG. 1 by numerals 37. As is known, a fixture includes a set of contacts for each lamp. The set includes two spaced apart pairs of contacts, each pair of contacts being designed to engage or receive the two pins 35 extending from one of the lamp's ends. Such lamps come in different lengths for accommodation in different type fixtures. Lamps of lengths of 48 inches with a wattage rating of 40w are extensively employed, particularly in commercial buildings. Typically, in a single room with several fixtures, a single wall switch 25 is used to control all of the fixtures.

As is known, in a two-lamp fixture such as fixture 11 or 12, when either lamp L1 or L2 is removed or fails (burns out) the other lamp is deactivated. Thus, no light is provided from that fixture, and the space designed to be illuminated by this fixture is darkened. In establishments which were built with two-lamp fixtures the removal of lamps from such fixtures during the energy crisis resulted in very uneven illumination. In a four-lamp fixture, such as fixture 13, the removal of one lamp, such as lamp L, deactivated L2. Thus, only half of the illumination was produced. Means are not available to enable the removal of only one lamp from a two-lamp fixture, or from a four-lamp fixture, while enabling the remaining lamps to remain active.

Measurements with a two-lamp fixture with two 48 inch, 40w active lamp, indicated a current flow of 0.829 ampere at 115 volts, equally 95.3 volt amperes, with a voltage consumption of 88w, representing a power factor $\phi$= 0.92. The total measured illumination was 50 foot candles. The same fixture with one lamp removed, thereby disabling the other lamp, obviously produces zero illumination. However, the power consumption under these circumstances is not zero. At 115v, the measured flowing current was found to be 0.239A representing 27.5 volt-amperes. The consumed power in watts was 3.8w representing a power factor of 0.14 which is highly inductive. This is due to the fact that portion 20 of the main winding 18 is permanently connected across the power lines 23 and 24, and therefore draws current even if the lamps L1 and L2 are inactive.

It should thus be appreciated that the complete disabling of a two-lamp fixture does not result in total power saving where a number of these fixtures are controlled by a single switch and say, a lamp is removed from every other fixture to save power. Furthermore, the fact that the fixture, though not producing any illumination, is highly inductive is very undesirable. As previously pointed out, in a large institution if many such fixtures are disabled, the total load becomes very inductive, adding to the inductive loading of operating equipment. Thus, the problem of correcting power factor is increased. This increases the required size (capacity) of the needed power factor correction equipment, which is quite expensive.

All of these problems are overcome with the present invention. In accordance with the invention either lamp in a two-lamp fixture is replaceable by an ac capacitor of proper value and proper voltage rating, e.g., 220 volts for a 115 volt power system. Capacitance of the capacitor is chosen as that which provides the best power efficiency. This will vary with the type and make of fixture however, it was found that as a general rule, where fine tuning is not desired to be made, a value of 4$\mu$f for (the average) rapid start fixtures is an excellent choice for 115v, 60Hz power supplies.

Figure 3:
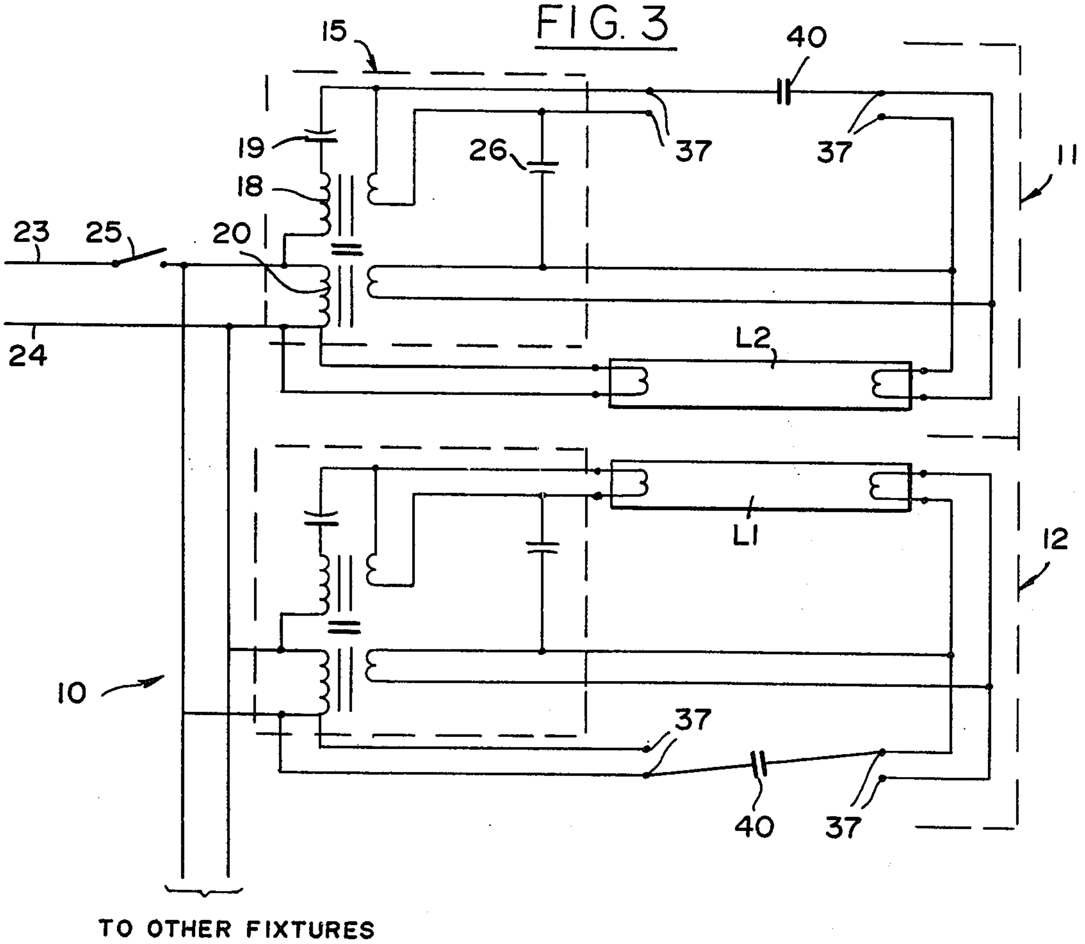
FIG. 3 is a schematic diagram of a lighting arrangement including two two-lamp fixtures, with a lamp replacement device in accordance with the present invention in each of the fixtures.

FIG. 3 is a schematic diagram of fixtures 11 and 12 with one capacitor 40 shown replacing lamp L1 in fixture 11 and another capacitor 40 instead of lamp L2 in fixture 12. As shown, capacitor 40 in fixture 11 is connected at each of the two ends to the upper contacts 37 in the fixture, while capacitor 40 in fixture 12 is connected to one lower contact 37 and one upper contact 37. For operation, it does not matter to which of the two contacts 37, provided for each end of a regular lamp the capacitor is connected, as long as it is connected only to one contact at each end. The two contacts at the same end should not be shorted out.

With the capacitor 40 in circuit, both the capactor and the lamp L2 are connected in series across the transformer 15, thereby enabling lamp L2 to be active even though no lamp is present in the location of the capacitor.

The following short table shows a comparison between two lamps in a rapid start fixture, one lamp and one capacitor in a rapid start fixture and a fixture with no lamps or one lamp.

| NO. OF LAMPS | V-A VOLT | FREQ. (Hz) | WATTS (W) | POWER FACTOR (φ) | F/C WATT |
|---|---|---|---|---|---|
| 2 | 99 | 60 | 100 | 1 | 0.80 |
| 1 + 4μf | 31 | 60 | 23 | 0.97 | 0.77 |
| 0 | 27.5 | 60 | 3.8 | .14 | 0 |

The table shows that the fixture still absorbs 3.8 watts with no lamps and no illumination being provided and provides a very poor power factor of 0.14. A surprising feature of this invention is that the one illuminated lamp still provides 0.77 foot candles per watt and the power factor still remains substantially high, namely at 0.87.

It should also be noted that the change in power factor occurring when this invention is used is far less than what occurs when a lamp is simply pulled out, and is more easily correctable.

Besides the foregoing, another advantage of the invention is, in enabling the light distribution to be more uniform. As previously indicated in a lighting arrangement for a plurality of two-lamp fixtures, those fixtures which are disabled produce dark areas. Thus, illumination is not uniform. However, with the present invention, each two-lamp fixture may be used to provide illumination by inserting therein a capacitor 40 so that the other lamp in the fixture is active.

The present invention is also advantageous when incorporated in a four-lamp fixture such as fixture 13 (see FIG. 1). Such a fixture without the present invention can only be operated with an even number of active lamps. If one lamp, such as L1 is removed lamp L2 is deactivated. Thus, only lamps L3 and L4 are on.

It should be pointed out that if more power reduction is required, instead of disabling two lamps connected to the same transformer 15 it is preferred to replace a capacitor 40 in the loop of each transformer. In such a case, the four-lamp fixture would function as two two-lamp fixtures with a lamp-replacement capacitor in each.

To facilitate the replacement of a lamp by the capacitor 40 it is preferred to enclose the latter in a hollow tube with end caps and protruding pin such as those of the conventional lamp to be replaced. The capacitor 40 within the tube should be connected to one pin at each end cap. The total length of the tube with the pins should be equal to that of the conventional lamp to be replaced. With such a device replacement is achievable by merely removing the conventional lamp and replacing it with the capacitor-containing tube which outwardly is identical to the normal lamp. FIG. **2*b* to which reference is made shows the capacitor 40, enclosed in a hollow tube 45, capped at its ends by end caps 33*a* and 34 which are substantially identical to end caps 33 and 34 of the conventional lamp (see FIG. 2*a*). The capacitor 40 is connected to only one pin 35 extending from each end cap into the tube 45. As shown, the capacitor 40 is connected to one upper pin 35 and one lower pin 35. However, as clearly pointed out hereinbefore, the capacitor can be connected to the two upper or the two lower pins 35**.

As previously indicated the foregoing mentioned values of current, voltage, wattage, power factor and foot candle as well as the value of the capacitor 40, as 4μf, were obtained in connection with an embodiment of the invention to replace a lamp 48 inches long of 40w rating, in a fixture designed to operate at about 115v ac at 60Hz. Clearly, to replace different size lamps the size of the capacitor has to be different.

The simplest way to determine an optimum capacitance is to connect a variable capacitor across the contacts from which a lamp has been removed. The variable capacitor is then varied to provide maximum efficiency from the other lamp to provide an optimum use of the energy being supplied.

Figure 4:
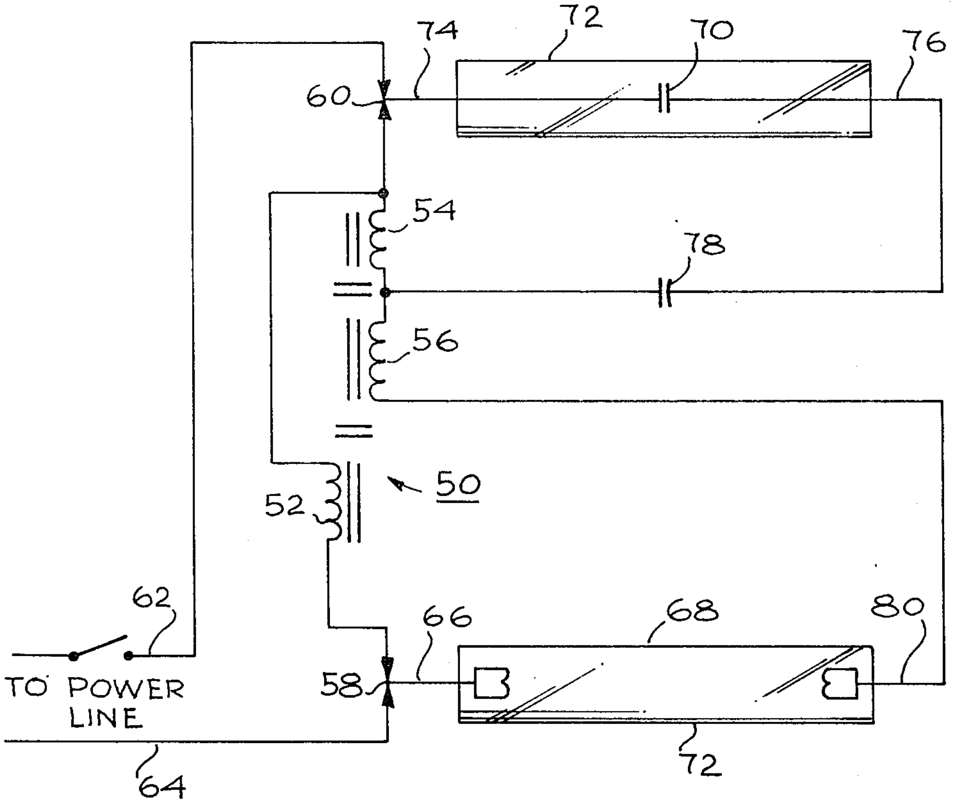
FIG. 4 is a schematic diagram illustrating the replacement of a lamp in an instant start fixture, in accordance with this invention.

FIG. 4 is a schematic diagram illustrating an embodiment of the invention being used in an instant start fixture whch uses "cold cathode" (no filament) lamps. The fixture includes a transformer 50 having a primary winding 52, an auxiliary winding 54 and a secondary winding 56. The primary winding is connected to two disconnect sockets, respectively 58, 60, which in turn are respectively connected to the power lines 62, 64. The disconnect sockets serve to remove power from the transformer primary winding when a lamp is removed. A pin 66 from a lamp 68 fits into the disconnect socket to make the power connection.

A capacitor 70 in accordance with this invention, may be in a tube 72 having the same length and the same size pins respectively 74, 76 as the lamp it replaces.

In the arrangement shown, the primary winding 52 is connected across the power lines. The pin 66 of lamp 68 and the pin 74 of the capacitor lamp replacement are respectively connected to the respective power lines 64, 62. One end of secondary winding 56 is connected to the other pin 80 of the lamp 68 and the other end of the secondary winding is connected, through a power factor correcting capacitor 78 to the other pin 76 of capacitor 70, and to one end of auxiliary winding 54. The other end of the auxiliary winding is connected to the upper end of the primary windings.

When two cold cathode tubes are used, they start up one at a time. The insertion of capacitor 70 in place of one of the tubes would not change this operation. Here if there were two lamps in the fixture first tube 68 would turn on in view of the line voltage boost by the secondary and auxiliary windings. Then the second lamp, which would be in place of tube 72 would turn on in view of the line voltage increase caused by secondary winding 56 without the replacement of one of the two lamps in the fixture by a capacitor 70. The other lamp would not go on since no voltage would be applied across the primary winding in view of the presence of the disconnect socket and also because the lamps are effectively connected in series once they are both on, a lamp in place of the capacitor would pass auxiliary winding 78 once it turned on. It should be noted that regardless of which lamp is replaced by the capacitor in accordance with this invention, the other lamp will go on.

By way of example, a test was run using two cold cathode lamps in a fixture of the type described. The voltage applied was 121.5v ac 60Hz and 1.41 amps. Power consumed was 171 watts at a power factor of 0.983 with a lumen production of 200 foot candles, measured near the lamp bulb.

Using one lamp and one 6μfd capacitor, in accordance with this invention, the line voltage was 121.2 volts at 60 Hz. Current drawn was 0.68 amps. Power consumed was 79 watts, at a power factor of 0.97 producing 70 foot candles.

From the foregoing it can be seen that with an instant start fixture, replacing one of the instant start lamps with a capacitor having a value of 6μf, 70/200 = 35% of the light output is obtained with 79.171 = 46% of the power. The drop in power factor is very small and can be readily corrected. If disconnect sockets are not used, then power is drawn by reason of the transformer primary winding still being connected across the power lines, with no light being produced and a detrimental effect on the power factor.

Here too, if desired, the capacitor value may be varied to determine the value required for maximum power and light efficiency. However, a value of between 4 and 8μf has been found to work surprisingly well.

A comparison of the numbers shown in the table and the numbers given in the paragraph next preceding this one, may seem to show a discrepency. However, this is not so. Different ballasts and/or different lamp fixtures, and voltage variations, cause some variations in the results obtained. However, these variations are within an acceptable range and the results in all cases are a substantial improvement in the power factor and illumination obained.

There has accordingly been shown and described herein a novel and useful arrangement whereby a capacitor may be substituted for a lamp of either "rapid start" or "instant start" type in a fixture which connects two lamps in series, whereby uniform illumination and improved use of energy as well as a savings in energy may be obtained.

What is claimed:

1. In a fixture of the type wherein two fluorescent lamps inserted in sockets are connected in series and wherein it becomes necessary to remove one of said lamps from its socket, means for replacing said removed lamp and minimizing power factor deterioration of said fixture and remaining lamp as well as lumen output from the remaining one of said lamps, comprising capacitor means, inserted in the socket in place of said removed one of said lamps, having a predetermined value for preventing excessive loss of the power factor by said fixture and loss of lumen output by said remaining lamp, whereby as long as said capacitor means is connected in said socket no lamp can be inserted therein.

2. In a fixture as recited in claim 1 wherein said capacitor means has a value ranging from 4 to 8μf.

3. In a fixture as recited in claim 1 wherein said fixture and two fluorescent lamps are of the rapid start type wherein each said fluorescent lamp includes heated cathodes.

4. In a fixture as recited in claim 1 wherein said fixture and two fluorescent lamps are of the instant start type wherein each said fluorescent lamp includes cold cathodes.

5. In a fixture as recited in claim 1 wherein each said lamp is tube shaped having a predetermined length and bears a cap at each end with at least one pin extending therefrom, said fixture includes spaced sockets adapted to be engaged by the at least one pin extending from the ends of each said cap for enabling the application of operating voltage to each said fluorescent lamp, said means for replacing said removed lamp includes a tube means having said predetermined length and a cap means at each end with at least one pin extending from the cap means at each end for engaging a pair of spaced sockets in place of said one of said lamps, and means for connecting said capacitor means between the pins extending from the cap means at opposite ends of the tube means.

6. In combination:

a fluorescent lamp fixture including circuit means for applying energy to two fluorescent lamps, said circuit means including first and second sets of contact means, each set being adapted to receive therein a fluorescent lamp, said first and second sets of contact means and said circuit means being interconnected to interconnect in series two fluorescent lamps received by said first and second sets of contact means, and a fluorescent lamp inserted in and received by said first set of contact means, and capacitor means inserted in and received by said second set of contact means, in place of a fluorescent lamp, said capacitor means being characterized by a capacitance value which provides optimum efficient use of the energy applied to said fixture, lamp and capacitor means.

7. The combination as described in claim 6 wherein the fluorescent lamp inserted in said fixture is tube-shaped and has a preselected length, with at least one pin extending outwardly from each end thereof, each said set of contact means being adapted to receive the pins extending from each end of said inserted fluorescent lamp, said capacitor means including a hollow tube enclosing a capacitor, said hollow tube being of the same length said tube-shaped lamp and further including at least one pin extending from each end of said tube, means connecting said capacitor between said at least one pin extending from each end of said hollow tube, the length of said hollow tube with the pins extending therefrom enabling connection of said capacitor across said second set of contacts.

8. The combination as recited in claim 6 wherein said capacitor means has a value in the range between 6 and 8μf.

9. A method of providing illumination from a fluorescent lamp fixture of the type including circuit means having first and second sets of spaced contacts, adapted to receive therein a fluorescent lamp each said set of spaced contacts being interconnected to said circuit means to connect in series fluorescent lamps inserted in both said first and second sets of contacts, the steps comprising, inserting a fluorescent lamp in said first set of contacts; and connecting a capacitor between said second set of contacts where said fluorescent lamp is ordinarily connected, said capacitor having a value selected to optimize the lumen output and power used by said fixture, fluorescent lamp and capacitor.

10. The method as described in claim 9 wherein the capacitance value of said capacitor, is in the range between 4 and 8 μf.

11. A device for replacing, in the socket of a fixture, one of two series connected fluorescent lamps which has been removed therefrom, while minimizing power factor deterioration and while maintaining the remaining lamp illuminated comprising capacitor means having a predetermined value for preventing excessive loss of the power factor by said fixture and loss of lumen output by said remaining lamp, and means for inserting said capacitor means in the socket in place of said one of two series connected fluorescent lamps which has been removed therefrom, whereby no fluorescent tube can be placed in said socket as long as said capacitor means is inserted therein.

12. A device as recited in claim 11 wherein each said fluorescent lamp is tube shaped, has a predetermined length and bears a cap at each end with at least one pin extending frm each cap, said fixture includes spaced sockets adapted to be engaged by said at least one pin extending from each cap, said means for enabling substitution of said capacitor means in place of said one of two series connected fluorescent lamps includes means for connecting said capacitor means between said spaced sockets.

13. A device as recited in claim 11 wherein said means for connecting said capacitor means between said spaced sockets includes a tube means having said predetermined length, a cap means at each end of said tube means having at least one pin extending from each cap for engaging said spaced sockets, and means for connecting said capacitor means between the pins in the cap means at each end of said tube means.

* * * * *